United States Patent
Gasthaus

(12)
(10) Patent No.: US 12,391,210 B2
(45) Date of Patent: Aug. 19, 2025

(54) BELT RETRACTOR

(71) Applicant: Autoliv Development AB, Vargarda (SE)

(72) Inventor: Thomas Gasthaus, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 310 days.

(21) Appl. No.: 18/160,788

(22) Filed: Jan. 27, 2023

(65) Prior Publication Data
US 2023/0242068 A1    Aug. 3, 2023

(30) Foreign Application Priority Data
Feb. 3, 2022  (DE) .......................... 102022102524.1

(51) Int. Cl.
*B60R 22/34* (2006.01)
*B60R 22/46* (2006.01)

(52) U.S. Cl.
CPC ............................... *B60R 22/4628* (2013.01)

(58) Field of Classification Search
CPC ..... B60R 22/34; B60R 22/46; B60R 22/4628; B60R 22/4633
See application file for complete search history.

(56) References Cited

U.S. PATENT DOCUMENTS

| | | | | |
|---|---|---|---|---|
| 7,832,768 B2* | 11/2010 | Singer | ................ | B60R 22/1952 |
| | | | | 297/480 |
| 9,604,595 B2* | 3/2017 | Betz | .................... | B60R 22/4619 |
| 9,630,588 B2* | 4/2017 | Betz | ........................ | B60R 22/46 |
| 10,479,318 B2* | 11/2019 | Hashimoto | ......... | B60R 22/4628 |

FOREIGN PATENT DOCUMENTS

| | | |
|---|---|---|
| DE | 102005050426 B3 | 3/2007 |
| DE | 102006015229 B3 | 7/2007 |
| DE | 102011117053 A1 | 5/2013 |
| DE | 102012217261 A1 | 3/2014 |
| DE | 102019218306 A1 | 5/2021 |
| EP | 2637902 B1 | 9/2013 |

\* cited by examiner

*Primary Examiner* — Sang K Kim
(74) *Attorney, Agent, or Firm* — DICKINSON WRIGHT PLLC

(57) ABSTRACT

The present invention relates to a belt retractor for a safety belt device, comprising a shaft for winding a belt, a frame, an opening in the frame, wherein the shaft extends through the opening, a locking element, and an internal toothing, wherein the locking element engages in the internal toothing to prevent the shaft from rotating in a direction of rotation, wherein the internal toothing is formed in a plate, and the plate is fastened to the frame, without a form-fitting connection with an inner contour of the opening.

7 Claims, 2 Drawing Sheets

BELT RETRACTOR

CROSS-REFERENCE TO RELATED APPLICATIONS

This application claims priority pursuant to 35 U.S.C. 119(a) to German Application No. 102022102524.1, filed Feb. 3, 2022, which application is incorporated herein by reference in its entirety.

FIELD

The present invention relates to a belt retractor for a safety belt device, wherein the belt retractor comprises a shaft for winding a belt, a frame, an opening in the frame through which the shaft extends, a locking element, and an internal toothing, wherein the locking element engages in the internal toothing in order to prevent rotation of the shaft in a direction of rotation.

BACKGROUND

DE 10 2006 015 229 B3, DE 10 2011 117 053 A1, and DE 10 2005 050 426 B3 each disclose belt retractors that are designed as end-fitting tensioners, in which the internal toothing is formed directly in the frame. Particularly in the case of a force acting in the belt extension direction, the locking element engages in the internal toothing, such that the rotation of the shaft is blocked, and the extension of the belt is prevented. Since the frame is made of a sheet metal, the support of the locking element (in the longitudinal direction of the shaft) is, however, small.

In order to increase the support, it is known to insert a ring having the internal toothing into the opening in the frame, wherein a form-fitting connection for transmitting the forces from the ring to the frame is formed between the inner contour of the opening and the ring. In order to form the form-fitting connection between the ring and the frame, the ring must therefore, for one, be profiled on its outer circumferential surface, and, in addition, the opening must have a correspondingly profiled inner contour. In addition, the ring must be caulked for fixing to the frame. Such a production of a form-fitting connection between the ring and the frame is both complex and requires higher manufacturing tolerances.

It is therefore an object of the present invention to eliminate the disadvantages described with reference to the prior art, and in particular to specify a belt retractor which is simpler to manufacture with lower manufacturing tolerances, and at the same time enables a large support for the locking element on the internal toothing.

SUMMARY

The object is achieved by a belt retractor with the features of the independent claim. Advantageous developments of the belt retractor are specified in the dependent claims and in the description, wherein it is possible for individual features of the advantageous developments to be combined with one another in a technically sensible manner.

The object is achieved in particular by a belt retractor having the features mentioned at the outset, in which the internal toothing is formed in a plate, and the plate is fastened to the frame, without a form-fitting connection with an inner contour of the opening.

In other words, the basic concept of the invention is that the internal toothing is formed on a separate component (namely, in the plate), and that the opening in the frame for receiving the shaft does not require any (profiled) inner contour that is to be functionally designed. Rather, the internal toothing is formed in the plate, which can have a greater thickness than the frame. The plate can thus be fastened to the frame without influence on the opening in the frame—for example, by riveting, screwing, caulking, or welding. Thus, the manufacturing effort is reduced, and smaller tolerances can be achieved.

The frame is produced in particular from a sheet metal and is bent in a U-shaped manner in cross-section, wherein in each case openings are formed in the opposite legs, in which openings the shaft is directly or indirectly rotatably mounted. One end of a belt is preferably attached to the shaft, the other end of which belt is connected or can be connected to an end fitting or a belt buckle.

The belt retractor is thus in particular a component of a safety belt device, which in particular has a tightening device which is connected to the shaft of the belt retractor. The tightening device comprises in particular a pyrotechnically-drivable pulling cable, wherein the pulling cable is connected to the shaft of the belt retractor. For this purpose, the pulling cable, in the initial state, can be wound onto the shaft of the belt retractor, wherein, by triggering the pyrotechnic drive, the pulling cable is unwound from the shaft, as a result of which the shaft is driven in a rotary movement that winds up the belt.

For this purpose, the tightening device can have a gas generator for generating a pressurized gas, a piston which can be driven by the pressurized gas, the pulling cable connected to the piston, and a tightening tube for receiving and guiding the piston. In this case, it can be provided in particular that the tightening device comprise a fastening part which has both a receptacle for the gas generator and a fastening portion for attaching the tightening device to the belt retractor.

In order to prevent that, after the tightening process, the belt wound onto the shaft be unwound from the shaft again, counter to the tightening direction, the locking element engages in the internal toothing. For this purpose, the locking element, designed for example as a hook, is mounted in a suitable manner, directly or indirectly, on or in the shaft, and optionally under pre-tension. During the tightening movement, the locking element ratchets over the internal toothing, wherein the locking element engages in the internal toothing in the event that the shaft rotates in the opposite direction.

For an exact alignment and simple assembly, the plate and the frame can have mutually-corresponding and interlocking form-fitting configurations outside the opening. For example, a projecting pin and a corresponding recess can be provided, which are brought into engagement with one another during assembly, such that a predetermined orientation of the plate on the frame is provided by the pin and the recess. These form-fitting configurations can optionally also serve to transmit forces acting on the frame from the shaft.

The plate is preferably of a thickness which corresponds to a thickness of the locking element (in the longitudinal direction of the shaft), such that the largest possible support for the locking element is provided.

The plate is in particular designed such that it does not engage in the opening in the frame. Rather, the plate is applied to the frame in particular on an outer side, such that a recess, having the internal toothing, of the plate is formed concentrically to the opening in the frame.

Accordingly, the inner contour of the opening has no projections and/or recesses formed in the radial direction to the shaft. The opening is preferably designed as a circular recess and in particular as a bore.

In a preferred embodiment, the plate is fastened to the frame by means of at least one fastening means, wherein the fastening means passes through the frame and the plate. For this purpose, the plate and the frame have holes which the fastening means can pass through. The fastening means can be designed, for example, as a screw. The plate and the frame are preferably riveted to one another.

BRIEF DESCRIPTION OF THE FIGURES

The invention and the technical environment are explained below by way of example, with reference to the figures. Shown, schematically, are.

DETAILED DESCRIPTION

Figure 1:
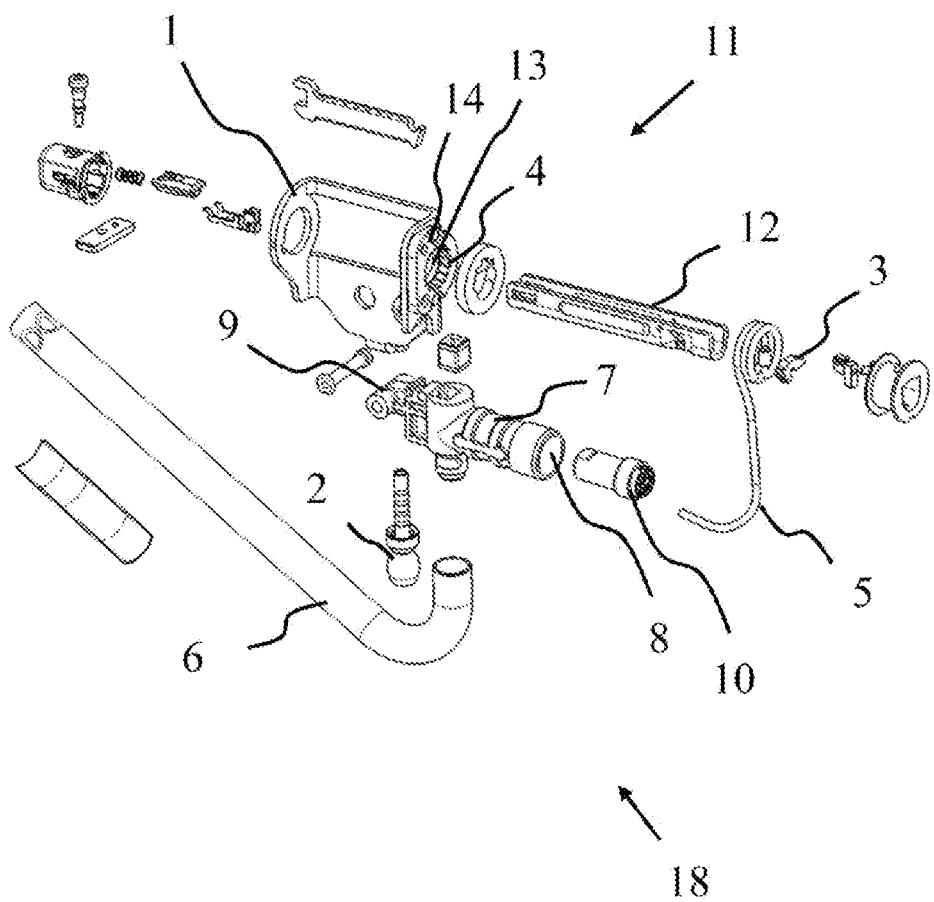
FIG. 1: an exploded view of a safety belt device.

The following description and corresponding drawings depict a belt retractor (11) for a safety belt device of the present invention, where the belt retractor (11) comprises a shaft (12) for winding a belt, a frame (1), an opening (13) in the frame (1), wherein the shaft (12) extends through the opening (13), a locking element (3), and an internal toothing (4), wherein the locking element (3) engages in the internal toothing (4) to prevent the shaft (12) from rotating in a direction of rotation, wherein the internal toothing (4) is formed in a plate (14), and the plate (14) is fastened to the frame (1), without a form-fitting connection with an inner contour (19) of the opening (13).

FIG. 1 is an exploded view of an end-fitting tensioner of a safety belt device. The safety belt device comprises a belt retractor 11 and a tightening device 18.

The belt retractor 11 comprises a frame 1 which is curved in a U-shape and on the legs of which openings are formed, in which openings a shaft 12 is indirectly rotatably mounted. The shaft 12 is used to wind up a belt (not shown). A plate 14, which has an internal toothing 4, is fastened to the one leg, wherein the internal toothing 4 is arranged concentrically to an opening 13, which receives the shaft 12, in the frame 1.

The belt retractor 11 also comprises a locking element 3 which engages in the internal toothing 4 in order to prevent a rotation of the shaft 12 in a direction in which the belt strap extends.

The tightening device 18 comprises a pulling cable 5, which, in the initial state, is wound onto the shaft 12. In the mounted state, the pulling cable 5 is connected to a piston 2 which is arranged in a tightening tube 6. For this purpose, the pulling cable 5 is guided through a fastening part 7 in which a gas generator receptacle 8 for a gas generator 10 is formed. The fastening part 7 also comprises a fastening portion 9, by means of which the fastening part 7 and the tightening tube 6 fastened thereto can be fastened to the belt retractor 11.

In the case of triggering, the piston 2 is driven by the pressurized gas, generated by the gas generator 10, through the tightening tube 6, as a result of which the pulling cable 5 is unwound from the shaft 12, and whereby the shaft 12 is caused to rotate. During this rotational movement, the belt strap (not shown) is wound onto the shaft 12, wherein the locking element 3 slides over the internal toothing 4. In contrast, when the shaft 12 is loaded against this tightening direction, the locking element 3 engages in the internal toothing 4, thereby preventing the belt strap from being unwound from the shaft 12.

Figure 2:
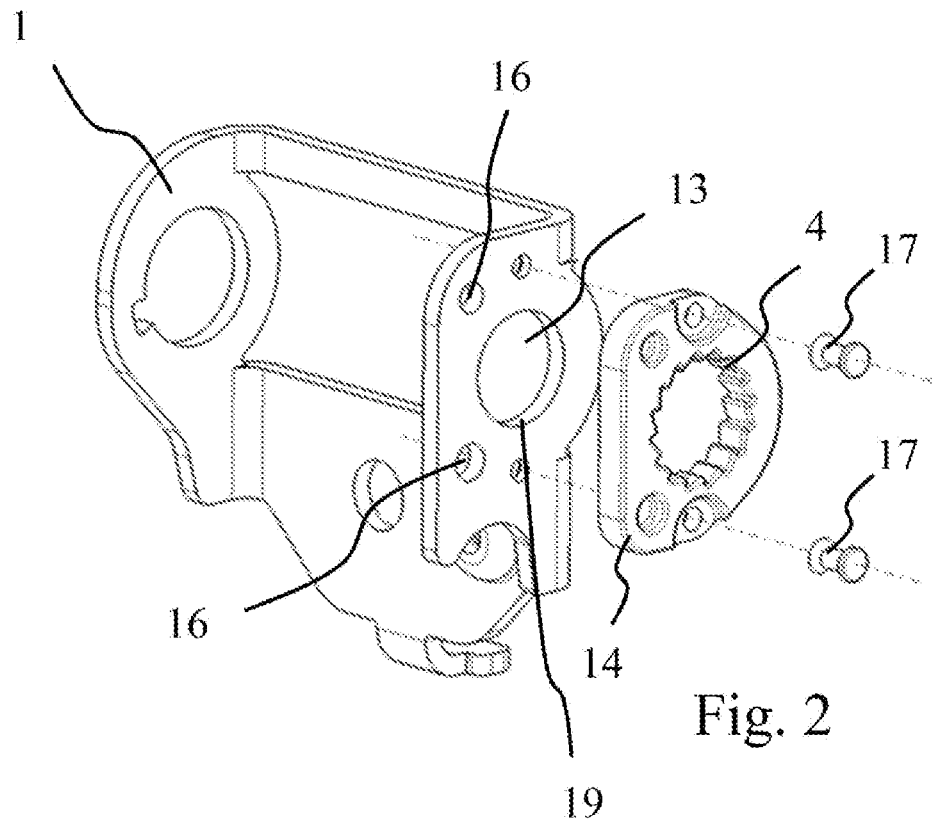
FIG. 2: an exploded view of components of a belt retractor with a plate.
Figure 3:
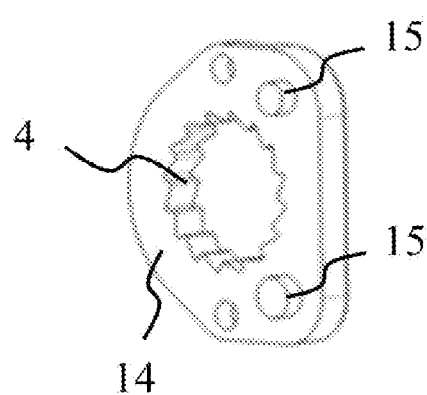
FIG. 3: the plate.

The present invention now proposes that the internal toothing 4 be formed on the plate 14, such that the internal toothing 4 can be produced independently of the opening 13 in the frame 1 during the manufacturing process. Thus, the internal toothing 4 can in particular have a greater extension in the longitudinal direction of the shaft 12, so that the support of the locking element 3 is enlarged. In addition, the plate 14 shown in FIGS. 2 and 3 does not engage in the opening 13, wherein there is no form-fitting connection between the plate 14 and an inner contour 19 of the opening 13 either.

Rather, on its side facing the frame 1, the plate 14 has pin-shaped projections 15 (see FIG. 3), which engage in corresponding recesses 16 in the frame 1. These mutually-corresponding, form-fitting configurations 15, 16 enable a simple and accurate alignment of the plate 14 relative to the frame 1 during assembly, and can also serve for force transmission from the plate 14 to the frame 1.

The plate 14 is also fastened to the frame by means of fastening means 17 designed as rivets. The belt retractor 11 is thus easy to assemble.

LIST OF REFERENCE SIGNS

1 Frame
2 Piston
3 Locking element
4 Internal toothing
5 Pulling cable
6 Tensioner tube
7 Fastening part
8 Gas generator receptacle
9 Fastening portion
10 Gas generator
11 Belt retractor
12 Shaft
13 Opening
14 Plate
15 Pin
16 Recess
17 Fastening means
18 Tensioning device
19 Inner contour

What is claimed is:

1. Belt A belt retractor, comprising
a shaft for winding a belt,
a frame,
an opening in the frame, wherein the shaft extends through the opening,
a locking element, and
an internal toothing,
wherein the locking element engages in the internal toothing in order to prevent the shaft from rotating in a direction of rotation, and
wherein
the internal toothing is formed in a plate, and
the plate is fastened to the frame by at least one fastening element passing through the plate and the frame as a separate component.

2. The belt retractor according to claim 1, wherein the plate and the frame have mutually-corresponding and interlocking form-fitting configurations outside of the opening.

3. The belt retractor according to claim 2, wherein the corresponding form-fitting configurations are designed as a projecting pin and corresponding recess.

4. The belt retractor according to claim 1, wherein the plate is designed as a punched part.

5. A safety belt device comprising the belt retractor according to claim 1 and a tightening device connected to the shaft of the belt retractor.

6. The safety belt device according to claim 5, wherein the tensioning device comprises a pulling cable which can be driven pyrotechnically and which is connected to the shaft of the belt retractor.

7. The safety belt device according to claim 5, wherein the tensioning device has a gas generator for generating a pressurized gas, a piston which can be driven by the pressurized gas, a pulling cable which is connected to the piston and which is connected to the shaft of the belt retractor, and a tensioner tube for receiving and guiding the piston.

* * * * *